(12) United States Patent
Grohmann et al.

(10) Patent No.: US 10,940,957 B2
(45) Date of Patent: Mar. 9, 2021

(54) HAPTIC ALERT MECHANISM FOR ALERTING AN AIRCRAFT PILOT, AND AN AIRCRAFT

(71) Applicants: AIRBUS HELICOPTERS, Marignane (FR); AIRBUS HELICOPTERS DEUTSCHLAND GMBH, Donauworth (DE)

(72) Inventors: Boris Grohmann, Munich (DE); Christophe Tempier, Vitrolles (FR); William Lagrevol, Saint Etienne (FR); Marc Salesse-Lavergne, Allauch (FR)

(73) Assignees: AIRBUS HELICOPTERS, Marignane (FR); AIRBUS HELICOPTERS DEUTSCHLAND GMBH, Donauworth (DE)

( * ) Notice: Subject to any disclaimer, the term of this patent is extended or adjusted under 35 U.S.C. 154(b) by 0 days.

(21) Appl. No.: 16/802,967

(22) Filed: Feb. 27, 2020

(65) Prior Publication Data
US 2020/0277082 A1  Sep. 3, 2020

(30) Foreign Application Priority Data
Feb. 28, 2019 (FR) ...................... 1902078

(51) Int. Cl.
*B64D 45/00* (2006.01)
*B64C 27/57* (2006.01)
*G08B 6/00* (2006.01)

(52) U.S. Cl.
CPC ............. *B64D 45/00* (2013.01); *B64C 27/57* (2013.01); *G08B 6/00* (2013.01)

(58) Field of Classification Search
None
See application file for complete search history.

(56) References Cited

U.S. PATENT DOCUMENTS 3,069,990 A * 12/1962 Eisbein ............... G03G 15/225
355/100
4,258,890 A *  3/1981 Korkosz .............. B64C 13/345
244/223

(Continued)

FOREIGN PATENT DOCUMENTS

EP        3069990 A1    9/2016
FR        2766158 A1    1/1999

(Continued)

OTHER PUBLICATIONS

French Search Report for French Application No. FR 1902078, Completed by the French Patent Office, dated Dec. 4, 2019, 9 pages.

*Primary Examiner* — Fekadeselassie Girma
(74) *Attorney, Agent, or Firm* — Brooks Kushman P.C.

(57) ABSTRACT

A haptic alert mechanism. The mechanism includes an actuator. At least one arm of a movable stopping piece is connected to the actuator. A spring box is provided with an enclosure containing a pre-stressed torsion spring, said spring box being mounted to be movable in rotation about the axis of rotation. The enclosure includes at least one lug that is mounted to be movable in rotation about said axis of rotation. A finger of the torsion spring passes through an elongate orifice in a front flank of the enclosure to form a movable, resilient stop that is overridable.

16 Claims, 5 Drawing Sheets

(56) References Cited

U.S. PATENT DOCUMENTS

| | | | | |
|---|---|---|---|---|
| 4,717,098 | A * | 1/1988 | Walker | B64C 13/0421 244/223 |
| 5,062,594 | A * | 11/1991 | Repperger | B64C 13/507 244/175 |
| 5,125,602 | A * | 6/1992 | Vauvelle | B64C 13/12 244/223 |
| 5,986,582 | A * | 11/1999 | Greene | G05D 1/0055 340/965 |
| 6,002,349 | A * | 12/1999 | Greene | B64D 43/00 340/965 |
| 6,390,412 | B1 * | 5/2002 | Stevens | B64C 27/006 244/17.11 |
| 6,512,344 | B1 * | 1/2003 | Konno | B64C 13/0421 318/560 |
| 6,644,600 | B1 * | 11/2003 | Olson | B64C 13/345 244/221 |
| 7,098,811 | B2 * | 8/2006 | Augustin | B64C 13/345 340/965 |
| 7,784,340 | B2 * | 8/2010 | Doversberger | B64C 13/18 73/170.02 |
| 8,181,914 | B2 * | 5/2012 | Kopp | F16F 1/14 244/229 |
| 8,271,151 | B2 * | 9/2012 | Hasan | B64C 27/54 701/3 |
| 8,729,848 | B2 * | 5/2014 | Scott | B64C 13/02 318/560 |
| 9,051,045 | B2 * | 6/2015 | Stachniak | B64C 13/503 |
| 9,058,750 | B2 * | 6/2015 | Bohlender | G09B 9/165 |
| 9,152,165 | B2 * | 10/2015 | Kreitmair-Steck | B64C 27/56 |
| 9,266,604 | B2 * | 2/2016 | Salamat | B64C 13/343 |
| 9,868,513 | B2 * | 1/2018 | Sandri | B64C 27/56 |
| 9,969,485 | B2 * | 5/2018 | Davies | B64C 13/22 |
| 10,317,928 | B2 * | 6/2019 | Izzo | B64C 13/0421 |
| 10,474,237 | B2 * | 11/2019 | Gush | G06F 3/016 |
| 10,556,668 | B2 * | 2/2020 | Grohmann | B64C 27/605 |
| 10,712,109 | B1 * | 7/2020 | Birgen | F41A 17/34 |
| 2005/0151672 | A1 * | 7/2005 | Augustin | B64C 13/345 340/965 |
| 2007/0265429 | A1 * | 11/2007 | Hudson | B29B 13/065 528/503 |
| 2010/0135103 | A1 * | 6/2010 | Mathis, Jr. | B07B 1/46 366/114 |
| 2012/0205494 | A1 * | 8/2012 | Taylor | B64C 13/10 244/223 |
| 2015/0191241 | A1 * | 7/2015 | Antraygue | B64C 13/0421 701/3 |
| 2015/0344128 | A1 * | 12/2015 | Sandri | G08B 6/00 244/223 |
| 2016/0122001 | A1 * | 5/2016 | Kennedy | B64C 13/0425 244/223 |
| 2016/0355251 | A1 * | 12/2016 | Davies | B64C 13/22 |
| 2018/0202715 | A1 * | 7/2018 | MacDonald | B65G 27/04 |

FOREIGN PATENT DOCUMENTS

| | | |
|---|---|---|
| FR | 2991288 A1 | 12/2013 |
| FR | 3021627 A1 | 12/2015 |
| WO | 200381554 A1 | 10/2003 |

* cited by examiner

HAPTIC ALERT MECHANISM FOR ALERTING AN AIRCRAFT PILOT, AND AN AIRCRAFT

CROSS-REFERENCE TO RELATED APPLICATIONS

This application claims priority to French patent application No. FR 19 02078 filed on Feb. 28, 2019, the disclosure of which is incorporated in its entirety by reference herein.

BACKGROUND OF THE INVENTION

(1) Field of the Invention

The present invention relates to a haptic alert mechanism for alerting an aircraft pilot, and to an aircraft. For example, the aircraft may be a rotorcraft equipped with flight control members for changing the pitch of the blades of a rotor that procures at least the lift for the rotorcraft. The present invention relates more particularly to such fight control members that have haptic alert mechanisms, also known as "tactile cueing" or "haptic feedback" mechanisms, warning a pilot of a rotorcraft that an operational limit of the aircraft is being exceeded.

(2) Description of Related Art

Rotorcrafts are rotary-wing aircraft for which, in particular, the lift is procured at least partially by a rotor.

In the specific context of a helicopter, a rotor known as the "main rotor" participates not only in providing lift for the rotorcraft but also in providing propulsion for it in any forward directions. On some helicopters a tail rotor is used to control the yaw movement of the aircraft.

The aircraft may have a cyclic stick that is connected by mechanical systems or "linkages" to a rotor for the purpose of cyclically controlling the pitch of the blades of a rotor, and a collective pitch lever that is connected by mechanical systems or "linkages" to the rotor for the purpose of collectively controlling the pitch of said blades. Moving the pitch lever induces an identical change in the pitch of the blades.

An autopilot system may include actuators that are arranged in parallel or in series with linkages for the purpose of generating automated flight controls.

Furthermore, the rotor(s) equipping an aircraft and in particular a rotorcraft are driven in rotation by a power plant provided with one or more engines, and possibly with at least one main gearbox and/or with one or more link shafts, etc.

Each engine may operate over an operating envelope including a plurality of different ratings, it being possible for each rating to be implemented by the engine. The limitations of an engine and the limitations of a main gearbox can make it possible to define various operating ratings at which an engine can operate, and in particular:

the takeoff rating, which is defined by a maximum takeoff power PMD and by a predetermined limited utilization duration for which the maximum takeoff power can be used;

the maximum continuous rating, which is defined by a maximum continuous power PMC corresponding, for example, to about 90% of the maximum takeoff power PMD, and by a utilization duration for which said maximum continuous power can be used that is generally unlimited; and a transient rating that is defined by a maximum transient power PMT.

On a multi-engined rotorcraft, the operating envelope also covers emergency contingency ratings that are used only when one of the engines has failed:

the first emergency rating, which is sometimes referred to as the "one-engine-inoperative, 30 seconds" (OEI30") rating, and which is defined by a super-contingency power PSU that is, for example, equal to about 112% to 120% of the maximum takeoff power PMD, and by a predetermined utilization duration for which the super-contingency power PSU can be used, it being conventionally possible for the super-contingency power to be used three times during a flight;

the second emergency rating, which is sometimes known as the "one-engine-inoperative, two minutes" (OEI2') rating, and which is defined by a maximum contingency power PMU that is, for example, equal to about 105% to 112% of the maximum takeoff power PMD and by a predetermined utilization duration for which the maximum contingency power PMU can be used; and the third emergency rating, which is sometimes referred to as the "one-engine-inoperative, continuous" (OEICont) rating, and which is defined by an intermediate contingency power PIU that is substantially equal to the maximum takeoff power PMD, and by an unlimited duration of utilization at this intermediate contingency power PIU for the remainder of the flight after the turboshaft engine has failed.

For each rating, operating limitations are defined that make it possible to obtain the above-mentioned powers PMC (maximum continuous power), PMD (maximum takeoff power), PMT (maximum transient power), PSU (super-contingency power), PMU (maximum contingency power), and PIU (intermediate contingency power). On a turboshaft engine, these limits are generally monitored via three monitoring parameters for monitoring the turboshaft engine: the speed of rotation of the gas generator of the turboshaft engine, the engine torque, and the temperature of the gases at the inlet to the low-pressure free turbine of the turboshaft engine, these parameters being respectively labeled Ng, Cm, and T45 by the person skilled in the art. If the turboshaft engine has a high-pressure turbine stage, it is also possible to use the TET of the gases at the inlet to the high-pressure turbine.

Thus, for each rating of the operating envelope of the engine, the engine manufacturer establishes limits for each monitoring parameter for monitoring the engine.

In order to monitor these limits, the aircraft may have multiple indicators, each indicator providing information relating to a single monitoring parameter.

In order to limit the number of indicators, a first limitation instrument "FLI" may be used.

Other operating limitations may be of the structural type by being functions of load factors undergone, or of the aerodynamic type by relating, for example, to the vortex domain of the aircraft.

Haptic feedback systems may also be arranged to warn a pilot tactilely that an operating limit has been reached. Such systems are used, in particular, if the pilot needs to observe the outside environment during a particular phase and when the pilot cannot therefore look at the various instruments provided for monitoring those limits.

As indicated above, an aircraft can be equipped with parallel actuators of an autopilot system that may be referred to conventionally as "trim actuators". For any given control linkage, a trim actuator has a motor arranged in parallel with a flight control member in order to be capable of moving a portion of the linkage connected to said flight control member over a large amplitude at a low speed.

Such a trim actuator may also transmit a sensation of force to the pilot in response to the pilot maneuvering the blades by acting on a flight control member, in particular a collective pitch lever. For this purpose, the trim actuator incorporates a force feedback system that generates a resistive force against drive exerted by a human pilot on the flight control member. The human pilot may have a control available for inhibiting implementation of the force feedback system, such a control being referred to as the "trim release".

For example, at high speeds, a resistive force is generated on a two-engined aircraft having no engine inoperative when a limit of the maximum continuous power rating PMC is exceeded, that force increasing as the aircraft comes closer to a limit of the transient power rating. If one engine is inoperative, a resistive force is generated when a limit of the third emergency rating is exceeded, that force increasing as the aircraft comes closer to a limit of the first emergency rating. The operating limit as from which the resistive force is generated is therefore variable.

The various different known types of trim actuator include:

motor-driven friction trim actuators of the passive type that procure a constant resistive force that is independent of the position of the flight control member; and motor-driven trim actuators of the passive or active anchoring type that procure a variable resistive force against maneuvering of the main control linkage by the flight control member driven by a human pilot.

Document FR 2 766 158 discloses a device having a stop for forming a hard spot opposing continuation of a movement of a collective pitch lever. The stop is mounted to move by being driven by a motor.

In a variant, that device has a motor connected to an inlet of a speed-reducing gearbox. An outlet of the speed-reducing gearbox is connected to a first shaft by a friction coupling. The first shaft is fastened to a plate carrying two projections forming two stops. A stopping piece is mounted to move in rotation between the two stops. The stopping piece is connected via a second shaft to one end of an intermediate lever by a "fuse" member, another end of the intermediate lever being connected by means of a rigid connecting rod to a collective pitch linkage. Movement in rotation of the collective pitch lever causes the stopping piece to move in rotation.

Document U.S. Pat. No. 7,098,811 discloses alerting device made up firstly of a stick shaker and secondly of a spring cartridge mounted to be engaged on a linkage connected to a collective pitch lever. The spring cartridge extends from an end fastened to the linkage to an end fastened to an arm of an electric motor, operation of which is placed under the dependence of a computer unit.

At rest, the motor does not exert any force on the spring cartridge, the arm being mounted to be free to move in rotation. When a first emergency threshold is reached, the computer unit activates the electric motor so that the spring cartridge generates a resistive force against the pilot maneuvering the pitch lever. At a second emergency threshold, the computer unit activates the shaker.

Document EP 3 069 990 discloses a mechanism equipped with a stepper motor.

Document FR 2 991 288 is also known.

BRIEF SUMMARY OF THE INVENTION

An object of the present invention is to propose an innovative mechanism that is relatively simple and that is suitable for optimizing the safety of the system.

Thus, the invention provides a haptic alert mechanism configured to exert a force on a lever in order to indicate tactilely that an operating limit has been exceeded, said mechanism comprising an actuator. Said actuator may be fastened to a support that is itself fastened to a structure, e.g., a structure of a vehicle, or said actuator may be fastened directly to such a structure.

Said mechanism further comprises:

at least one arm of a movable stopping piece, said arm being caused to move in rotation about an axis of rotation by said actuator; and a spring box provided with an enclosure inside which a pre-stressed torsion spring is arranged, said spring box being mounted to be movable in rotation about said axis of rotation, said enclosure including at least one lug that is mounted to be movable in rotation about said axis of rotation, said enclosure having a front flank, said torsion spring extending from a first end that is secured to the enclosure to a finger, said finger passing through an elongate orifice in said front flank and extending in part outside the enclosure by forming a movable, resilient stop that is overridable and therefore adjustable, the mechanism having a rest position for said finger about said axis of rotation in the absence of any force exerted on the finger by said lever, which rest position is adjustable by moving said stopping piece, the finger being in said rest position representing said operating limit when the lug is in contact with said at least one arm, said finger being movable in said orifice by compressing said torsion spring when said lever exerts a force on said finger with a view to overriding said operating limit.

In a variant, the mechanism may, for safety reasons, further include a body that is mounted to be constrained not to move in rotation about the axis of rotation, said body carrying at least one stop member forming a stop member that is constrained not to move in rotation about the axis of rotation and that limits the amplitude of rotation of a lug by shape interference.

The expression "stop member that is constrained not to move in rotation about the axis of rotation" means that the stop member does not have any degree of freedom to move in rotation about the axis of rotation during operation. The stop member may more generally not have any degree of freedom during operation.

The mechanism thus has a spring box that is provided with a finger that is mounted to be movable relative to the enclosure of said spring box when a force is exerted on said finger by a lever. The spring box may be mounted to be free to move in rotation about the axis of rotation. The rest position of the finger is adjustable by moving, at least in a first direction of rotation, each lug with an arm with the actuator, this rest position optionally being stopped for safety reasons in a second direction of rotation by the stop member.

The position referred to by convenience as the "rest position" represents the position in which the finger finds itself when the lever does not exert any force on said finger urging the finger to move relative to the enclosure. This rest position illustrates, for example, an operating limit of an aircraft. When the operating limit varies, the actuator moves each arm. For example, when the operating limit relates to a monitoring parameter of a two-engined power plant, failure of one engine of the power plant induces movement of the arm.

If one arm is in contact with a lug at the end of or during rotation of the arm, then the finger finds itself in the rest position illustrating the operating limit at the end of said rotation of the arm.

If the arm is not in contact with the lug at the end of said rotation, subsequent contact of the lever against the finger induces movement of the spring box towards the arm. When the lug comes into contact with the arm then the new operating limit is reached.

The expression "movable resilient stop that is overridable" means that the position of the finger is adjustable, which makes the stop adjustable.

In addition, by pushing said finger from the rest position with the lever by causing said finger to slide in the elongate orifice, the mechanism authorizes movement of the lever inducing the operating limit to be exceeded. The elongate orifice represents a rail or slideway guiding movement of the finger. During this movement, the torsion spring generates a resistive force against drive by a human pilot on the lever. During this movement, the spring box generates a force gradient that can be felt by a pilot. This characteristic justifies the use of the term "overridable" insofar as the finger does not block the movement of the lever when the operating limit is reached, at least over a range corresponding to the length of the elongate orifice.

In addition, if the pilot releases the lever, the finger returns to its rest position, which explains the use of the term "resilient".

The mechanism of the invention can thus enable a pilot to feel that an operating limit is being exceeded while also authorizing said operating limit to be exceeded. The lever may be a member that, when moved, induces a variation in the operating limit.

In addition, the mechanism is mechanically simple by using a simple pre-stressed spring. Furthermore, the actuator can be relatively slow and generates a simple power, which procures good safety.

The mechanism is therefore not a trim actuator and proves to be simpler than a trim actuator.

The mechanism may also include one or more of the following characteristics.

In one aspect, the elongate orifice may be an oblong hole centered on the axis of rotation.

The oblong hole may be dimensioned to cover the entire movement of the lever even if the mechanism is anchored at the lower end of its stroke.

In one aspect, the finger may be mounted to be movable in said orifice over a path from and including a first edge of the orifice to but not including a second edge of the orifice, said finger being pressed against the first edge in the absence of any force exerted on the finger by said lever, a clearance always separating the finger from the second edge of the orifice.

Such clearance tends to make it possible to guarantee theoretical full movement of the lever of the control. When the lever is a collective pitch lever, this characteristic makes it possible to guarantee that the lever can reach the collective pitch stops.

In one aspect, the pre-stressing may be not adjustable.

In one aspect, the actuator may be provided with a rotary portion and with a non-rotary portion, said actuator having a brake configured to hold said rotary portion stationary relative to the non-rotary portion.

For example, the brake holds the rotary portion stationary relative to the non-rotary portion when the arm is held stationary so as not to have to keep the arm in position by using the actuator.

The actuator may be an electric motor, and, for example be a brushed motor, a brushless motor, or a stepper motor.

The mechanism may further comprise a sensor for measuring the position of the spring box, and, for example, a sensor for sensing the position of the motor of the actuator.

In one aspect, the actuator may be provided with a rotary portion that is mounted to be movable in rotation about said axis of rotation and that is connected to said at least one arm.

In one aspect, said at least one arm of the mechanism may comprise at least two said arms carried by a hub fastened to the actuator, said spring box having one lug per arm.

Each arm may extend radially or substantially radially relative to the axis of rotation. For example, the stopping piece may have a star-shaped structure provided with three arms.

In a variant, the enclosure may be free to move in rotation about the axis of rotation, it being possible, in the presence of a stop member, for at least one lug to be disposed between an arm and such an optional stop member.

In another variant, at least one arm includes a yoke provided with two cheeks, a lug being arranged between said two cheeks. An arm can then induce the rotation of the enclosure in two opposite directions. This configuration does not preclude arranging a body having a stop member.

In one aspect, the body may optionally be disposed at least partially around the actuator, said optional stop member possibly extending radially relative to said axis of rotation and away from the actuator, said spring box being mounted to pivot about the body.

Optionally, an enclosure may be mounted to pivot about the actuator when the body is not provided, or about the body, when it is provided.

In one aspect, the enclosure may comprise:

a first component comprising a rear flank carrying first branches, said rear flank optionally being provided with a hole through which the actuator and said body pass, each first branch extending from said rear flank in an axial direction, said first end of the torsion spring being fastened to the first component;

a second component provided with a ring carrying one second branch per first branch, said torsion spring extending in part inside a space arranged radially between the first branches and longitudinally between the rear flank and the ring, each second branch extending from said ring parallel to a first branch and away from said space, each second branch forming a lug at least in part, said finger passing through said ring and projecting longitudinally relative to planes containing free ends of the first branches and of the second branches; and a bearing passing through said rear flank and said torsion spring and said ring, said bearing carrying said front flank, said front flank having one notch per lug, each lug being arranged in one of said notches, and the stop member optionally being arranged longitudinally between the front flank and said at least one arm.

Such a mechanism proves simple and compact.

Each second branch may be arranged radially between a first branch and the axis of rotation, and may radially adjoin a first branch.

Each second branch may be fastened to a first branch by conventional means.

In one aspect, the mechanism may further comprise a contactor that detects contact between said finger and said lever.

The term "contactor" means a sensor that detects contact. For example, the contactor is carried by the lever.

Such a contactor may be used for safety reasons on an aircraft, e.g., for triggering an alarm and/or for releasing the brake if the contactor detects contact between the lever and the finger when the operating limit is not considered as having been reached by other members of the aircraft.

Additionally or alternatively, such a contactor may make it possible to realign the position of the resilient stop with the position of a control connected to the mechanism. When the control is moved and causes the contactor to switch, then the difference between a measurement of the position of the stick and a measurement of the position of the anchoring of the resilient stop may be stored in a computer in order to enable the position of the resilient stop to be adjusted subsequently. After the first realignment, the contactor enables the computer to check, at each switching, that the resilient stop is correctly positioned, namely at the time of switching into the stored position. If it is not, the computer can control the mechanism so as to readjust the position of the resilient stop in order to move it into the required position and/or can indicate an operating anomaly of the resilient stop mechanism, and/or can passivate it by declutching.

In one aspect, the operating limit may be at least one of the following limits: a limit for a power plant of an aircraft equipped with the mechanism, a limit for a load factor exerted on an aircraft equipped with the mechanism, a limit for a vortex domain of an aircraft equipped with the mechanism, a limit for a maximum air speed ("Velocity, Never Exceed" or "VNE") of an aircraft equipped with the mechanism, a limit for a speed of rotation (Nr) of a main rotor, and a limit for a mast moment for a rotor of an aircraft equipped with the mechanism, and, for example, of a main rotor on a helicopter.

The invention also provides an aircraft equipped with a rotor and with a collective pitch control that is connected to a control linkage for collectively controlling a pitch of the blades of the rotor, which collective pitch control includes a said lever.

The aircraft includes a mechanism of the invention, said aircraft including a computer connected to the actuator, the computer being configured to establish said operating limit and transmitting a control signal to the actuator so that the lever comes into contact with said finger when said operating limit is reached.

The invention also provides a method that comprises the following steps:

determining with the computer an operating limit for the aircraft;

transmitting with the computer to the actuator a control signal carrying information relating to the rest position that said finger should reach in the absence of any force exerted by the lever on the finger;

moving the actuator so as to position said finger in said rest position; and overriding said operating limit by exerting a force on said finger with the lever, the finger generating torque on the lever that increases as the finger moves away from the rest position.

BRIEF DESCRIPTION OF THE DRAWINGS

The invention and its advantages appear in greater detail from the following description of examples given by way of illustration with reference to the accompanying figures, in which.

DETAILED DESCRIPTION OF THE INVENTION

Elements that are present in more than one of the figures are given the same references in each of them.

Three mutually orthogonal directions X, Y, and Z are shown in some of the figures.

Figure 1:
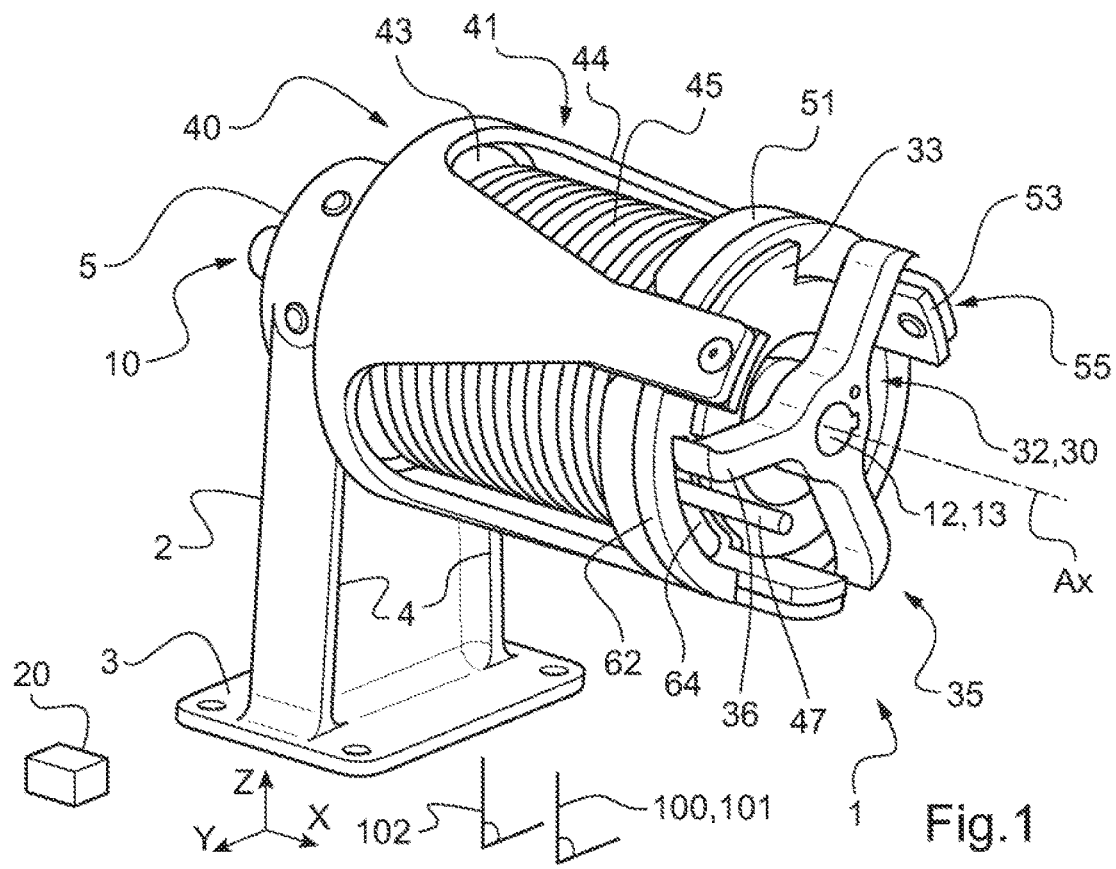
FIG. 1 is a view of a mechanism of the invention.
Figure 2:
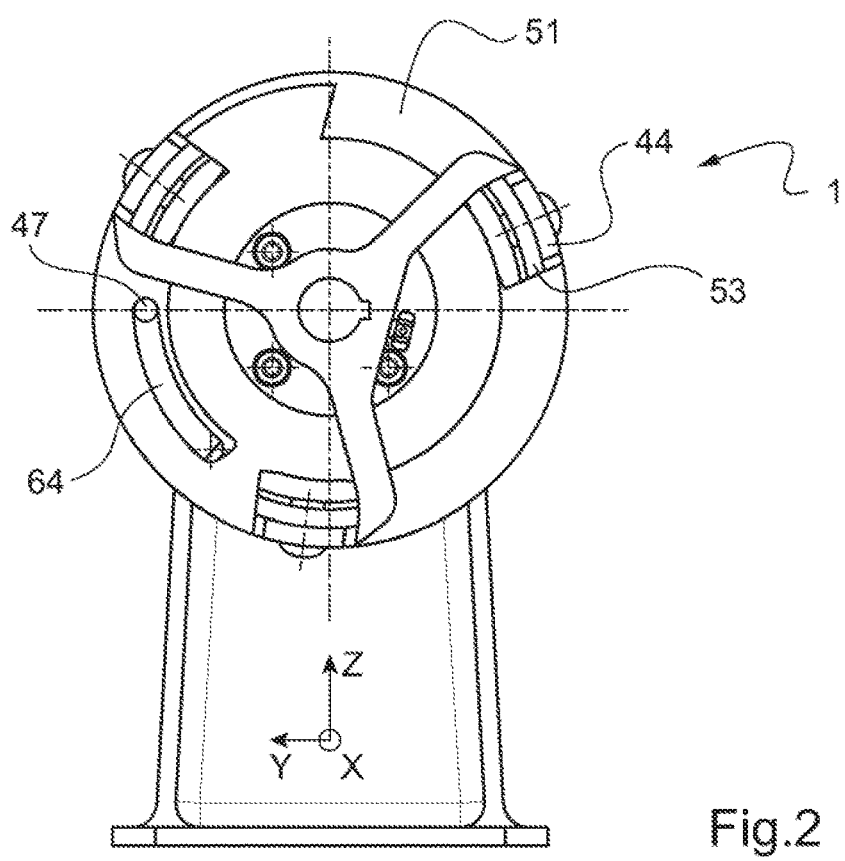
FIG. 2 is a view of a mechanism of the invention.
Figure 3:
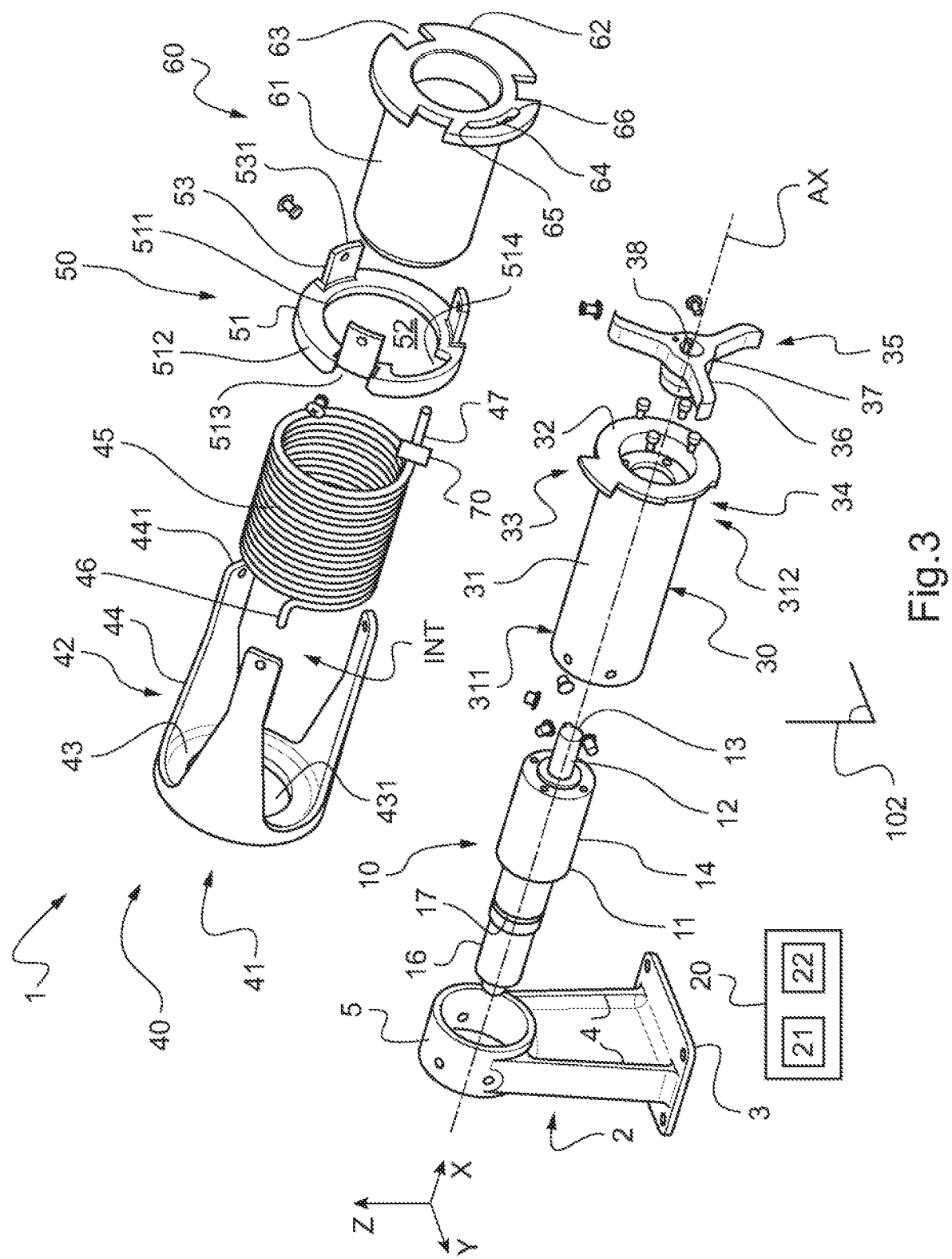
FIG. 3 is a view of a mechanism of the invention.

FIGS. 1 to 3 show a mechanism 1 of the invention having a finger that forms a stop for a lever that can come into abutment against said finger, the stop being a resiliently movable stop so that it can be overridden by the lever. FIG. 1 shows the mechanism in an isometric view, FIG. 2 showing the mechanism 1 as seen from the front. Finally, FIG. 3 is an exploded view of the mechanism 1.

FIG. 3 is an exploded and detailed view of an embodiment of the mechanism 1.

This mechanism includes an actuator 10. In this example, the actuator 10 is provided with an electric motor 11. The actuator 10 may be carried by a support 2. For example, such a support 2 has a base 3 configured to be fastened to a carrier by conventional means, e.g., by screwing, welding, riveting, adhesive bonding or like means. Such a support 2 may be secured to at least one leg 4, e.g., two legs as shown in FIG. 3, each leg 4 being fastened to receiving element 5 carrying the actuator 10 directly or indirectly.

The actuator 10 and its motor, if it has a motor, may be provided with a rotary portion 12 and with a non-rotary portion 14. For example, the non-rotary portion 14 drives the rotary portion 12 in rotation about the axis of rotation AX in conventional manner.

Said rotary portion 12 may be provided with an outlet shaft 13 that is driven in rotation directly by the non-rotary portion 14. Alternatively, the rotary portion 12 may comprise a rotor that is driven in rotation by the non-rotary portion 14, the rotor driving the outlet shaft 13 via speed-reducing gearing for reducing the speed of rotation.

In particular, the motor 11 of the actuator 10 may be a brushed or brushless rotary electric motor, or a stepper electric motor.

Optionally, the actuator is provided with a brake 16 making it possible to hold the actuator stationary, e.g., by holding the rotary portion 12 stationary relative to the non-rotary portion 14.

In addition, the actuator may be provided with a position sensor 17 making it possible to detect the position of the actuator, namely, for example, the position of a movable member of the actuator and, where applicable, of the rotary portion.

In one aspect, the actuator may be provided with an integrated processor unit that controls the motor 11 as instructed by a computer 20. The computer 20 may comprise a single computer unit or a plurality of different computer units. The computer 20 may, for example, comprise at least one processor 21, at least one memory 22, at least one integrated circuit, at least one programmable system, and/or at least one logic circuit, these examples not limiting the scope given to the expression "computer". Similarly, each computer unit may, for example, comprise at least one processor 21, at least one memory 22, at least one integrated circuit, at least one programmable system, and/or at least one logic circuit, these examples not limiting the scope given to the expression "computer unit".

Alternatively, or indeed additionally, the motor may be controlled directly by the computer 20.

In addition, the actuator 10 has the function of setting a stopping piece 35 in motion on request from the computer 20. For example, the actuator 10 drives the stopping piece 35 in rotation about an axis of rotation AX.

Therefore, the actuator is mechanically secured to a stopping piece 35 comprising at least one arm.

In the example shown in FIG. 3, the stopping piece 35 has a hub 37 that is constrained to rotate with the rotary portion 12. For example, the outlet shaft 13 of the rotary portion 12 is provided with an axial spline disposed in a groove 38 in the hub 37. The hub 37 also carries at least one arm 36, and in particular three arms as shown in FIG. 3.

The outlet shaft of the rotary portion 12 rotating about the axis of rotation AX thus induces rotation of each arm 36 about the axis of rotation AX.

In another aspect, the mechanism 1 may include a body 30.

Optionally, the body 30 is disposed at least partially around the actuator 10. The rotary portion 12 of the actuator 10 may, if necessary, project outside the body 30 to reach the stopping piece 35.

The body 30 is constrained not to move in rotation about the axis of rotation AX, e.g., by being fastened directly or indirectly to the support 2. In the example shown, the body comprises a hollow cylinder 31 that extends from a first end zone 311 screwed to the receiving element 5 of the support 2 to a second end zone 312 provided with an inner flange that is screwed to the non-rotary portion of the actuator 10 by at least one screw having a threaded shank extending parallel to the axis of rotation AX.

In addition, the body 30 may carry one or more stop members 33, and, for example, a single stop member 33 or one stop member 33 per arm 36. Each stop member 33 may extend radially away from the body 30 and from the axis of rotation AX in a geometrical plane 102 that is perpendicular to the axis of rotation AX. Said geometrical plane 102 passes through the stopping piece 35 and through each stop member 33. Each stop member 33 forms a stop member that is not therefore movable in rotation about the axis of rotation AX.

Optionally, the body 30 may be provided with an outer flange 32 that may carry each stop member 33. Such a flange is possibly provided with a recess 34, the function of which is specified below.

In addition, the mechanism 1 has an innovative spring box 40 that is mounted to be movable in rotation about the axis of rotation AX within the limits given by the stopping piece 35 and optionally by a stop member of the body 30.

The spring box 40 is optionally disposed to pivot about the actuator 10 and indeed, where applicable, about the body 30, and in particular the cylinder 31.

Said spring box 40 is provided with an enclosure 41 receiving a pre-stressed torsion spring 45 at least in part. In addition, said enclosure 41 is provided with one or more lugs 55. Each lug 55 is positioned in the geometrical plane 100 in order to be free to move in rotation about the axis of rotation AX. More precisely, the spring box 40 may be provided with one lug per arm.

In the variant shown in FIG. 3, the enclosure 41 is free to move in rotation, each lug 55 being positioned in the geometrical plane 100 in order to be free to move in rotation about the axis of rotation AX between an arm 36 of the stopping piece 35 and a stop member 33.

Figure 8:
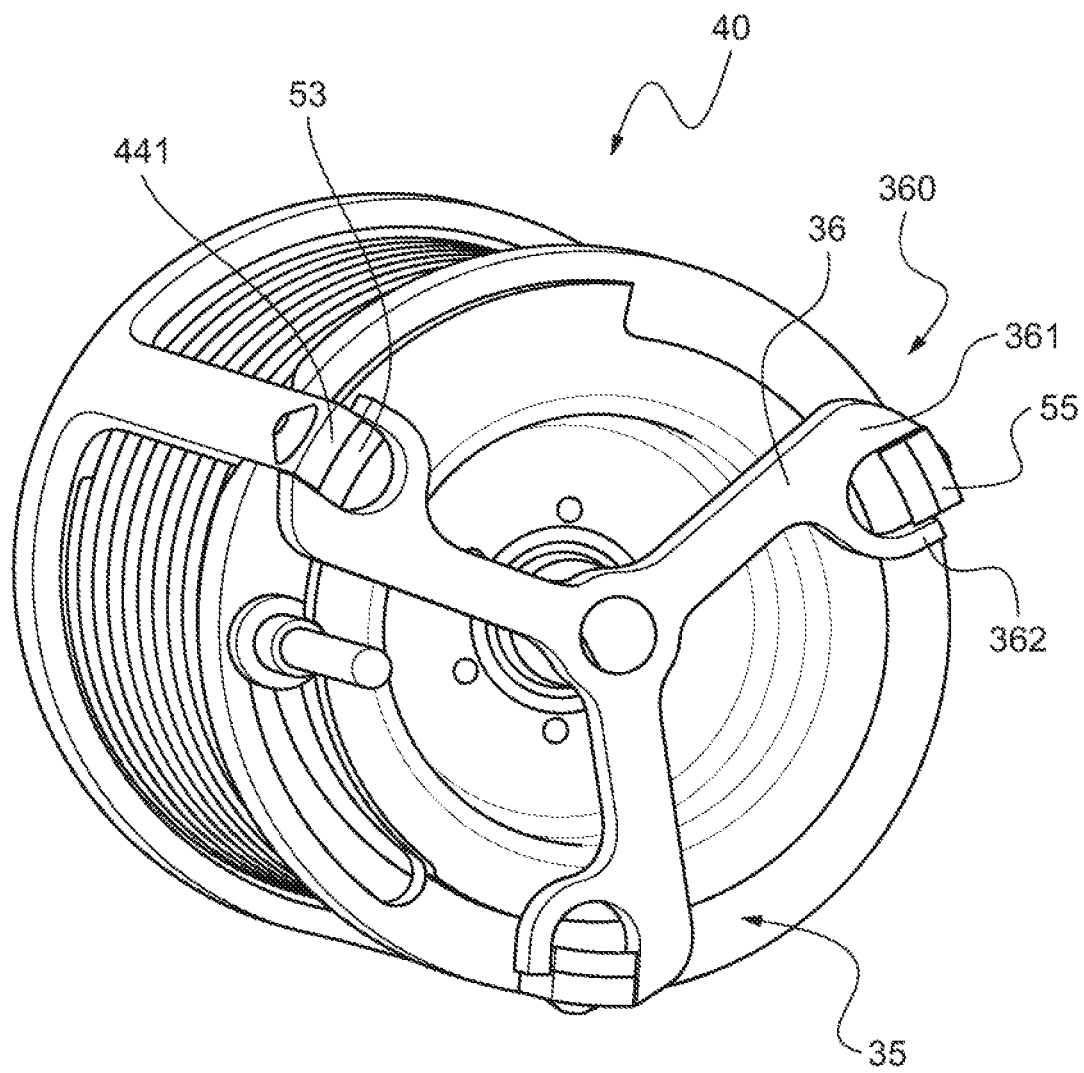
FIG. 8 is a view showing a stopping piece having arms provided with yokes.

In the variant shown in FIG. 8, each arm 36 may be provided with a yoke 360. Each yoke 360 is a female yoke provided with two cheeks 361, 362 between which a lug 55 is situated.

In addition, and with reference to FIG. 3, the spring box 40 includes a pre-stressed torsion spring 45 having a finger 47 mounted to move relative to the enclosure 41 of the spring box 40. The finger 47 passes through a front flank of the enclosure 41 to extend outside the enclosure and to project longitudinally relative to the geometrical plane 100. The finger 47 then forms a movable and overridable resilient stop of the mechanism 1.

In the embodiment shown in FIG. 3, the enclosure 41 includes a first component 42 forming an end-wall and possibly side walls of the enclosure, a second component 50 forming the front of the enclosure, and a third component 60 forming a bearing. The first component 42, the second component 50, and the third component 60 co-operate mutually to receive the torsion spring and to form each lug 55.

For example, the first component has a rear flank 43 that is substantially orthogonal to the axis of rotation AX. Said rear flank 43 has an annular shape and optionally has a hole 431 through which the actuator 10 and the body 30 pass.

In addition, the first component 42 is provided with a side wall secured to the rear flank 53. For example, said side wall is perforated. In the variant shown in FIG. 3, the side wall comprises first branches 44, and in particular, for example, three first branches 44. Each first branch 44 extends in an axial direction parallel to the axis of rotation AX to one end 441 from the rear flank 43, and, for example, from an outer periphery of the rear flank.

The second component 50 is provided with a ring 51 that extends radially from an inner edge 511 to an outer edge 512. The actuator 10 passes through said ring 51, possibly as do the body 30 and the third component 60. The ring 51 and the rear flank 43 longitudinally define a space INT inside the spring box.

In addition, the ring 51 carries at least one second branch 53, and, for example, as many second branches as there are first branches 44, i.e. three second branches in the example shown. Each second branch extends from the ring 51 parallel to a first branch 44 and away from the space INT to an end 531. The ends 531 of the second branches and the ends 441 of the first branches are, for example, positioned respectively in a first plane 100 and in a second plane 101 that are orthogonal to the axis of rotation AX. The first plane 100 and the second plane 101 may coincide.

Optionally, each second branch 53 is set into the ring 51 radially between the inner edge 511 and the outer edge 512 of the ring 51. The ring 51 can then have an outer opening 513 positioned radially above each second branch. 53. Each first branch 44 then passes through an outer opening 513. Each second branch 53 is then arranged radially between the axis of rotation AX and a first branch 44. In addition, the ring 51 may further be provided with an inner opening 514 in the inner edge 511.

Each first branch may be screwed or riveted to a second branch.

In addition, on its own or in co-operation with a first branch 44, and in particular with an end 441 of a first branch 44, each second branch 53 forms a lug 55.

Furthermore, the third component includes a bearing 61. Said bearing 61 may comprise a hollow cylinder. The bearing 61 extends longitudinally, e.g., from the rear flank 43, or indeed passes through said rear flank and then through the ring 51. The inside space INT of the spring box is then limited radially by the bearing 61 and by the first branches 44 of the first component.

Furthermore, the bearing 61 carries the front flank 62. Said front flank takes the form of a front flange that is provided with one notch 63 per lug 55. Each first branch and each second branch then pass through a respective one of the notches 63.

In addition, the bearing 61 is disposed around the body 30. The front flange 62 is then arranged in a plane that is orthogonal to the axis of rotation between the ring 51 and the outer flange 32 of the body 30. Each stop member 33 may then be arranged longitudinally between the front flank 62 and the stopping piece 35.

Finally, the spring box 40 includes the torsion spring 45 that extends partially inside the inside space INT. The torsion spring has, in succession, a first end 46 that is secured to the enclosure 41 and, for example, to the rear flank 43, a coil disposed about the axis of rotation AX inside the inside space INT, and then a finger 47 projecting from the inside space INT. For example, said finger extends in a direction parallel to the axis of rotation AX. In addition, said finger 47 can pass successively through the inner opening 514 of the second component, the recess 34 in the body 3, and then an elongate orifice 64 in the front flanks. The finger may project longitudinally from the first plane 100 and from the second plan 101 in order to be able to be in contact with the lever 76 so that the finger forms an overridable, movable, resilient stop.

In addition, the elongate orifice 64 may be an oblong hole centered on said axis of rotation AX.

In another aspect, the finger 47 is movable in the orifice 64 over a path from and including a first edge 65 of the orifice 64 to but not including a second edge 66 of said orifice 64. Since the spring is pre-stressed in the enclosure 41, the finger 47 is, in particular, pressed against the first edge 65 when no force is exerted on the finger 47 by said lever 76. However, the orifice 64 and the mechanism in general are dimensioned so that the finger 47 is never in contact with the second edge 66.

Optionally, this pre-stressing of the torsion spring is not adjustable.

Figure 4:
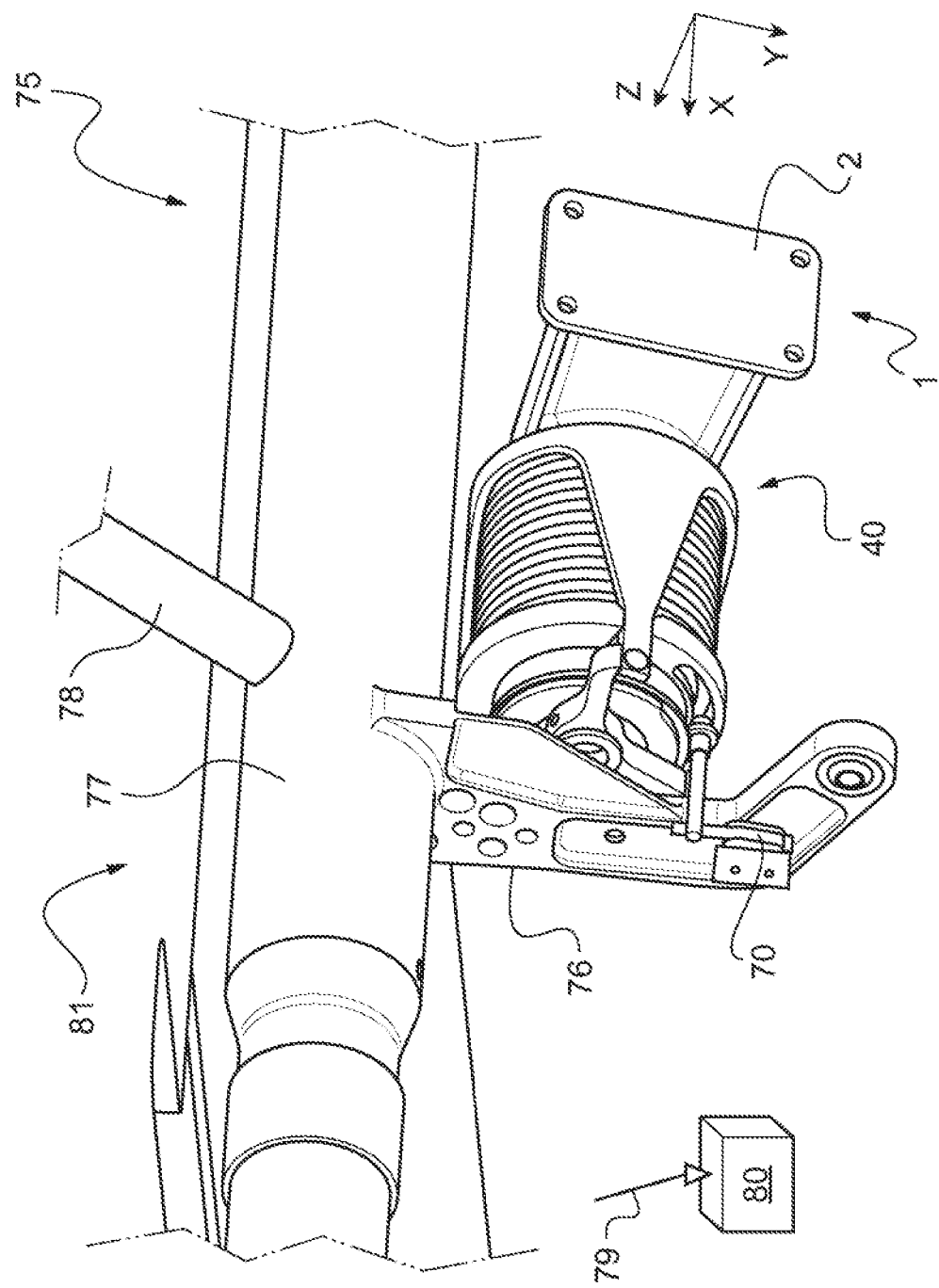
FIG. 4 is a view of a mechanism of the invention as co-operating with a lever.

In addition, the mechanism 1 may include a contactor 70 that detects contact between the finger 47 and the lever 76. This contactor is arranged on the finger 47 as shown in FIG. 3, but it may be arranged on the lever as shown in FIG. 4. For example, a contactor 70 may take the form of a push button. The contactor may be connected to the computer 20 or indeed to a warning system.

The above-described mechanism 1 may be positioned on any type of carrier that needs a resilient movable stop that can be overridden by a lever.

In particular, and as shown in FIG. 4, the mechanism may be arranged on an aircraft 75 that is provided with a rotor 80. The aircraft has a collective pitch control 81 connected to a linkage 79 for the purpose of collectively controlling the pitch of the blades of the rotor 80. Such a control 81 may, for example, comprise a stick 78 that is secured to a tube 77, the tube 77 itself being secured to a lever 76 that co-operates with a mechanism 1. Other arrangements are possible, and, in particular, conventional arrangements.

A computer 20 is then configured to establish an operating limit and to transmit a control signal for controlling the actuator 10 so that the lever 76 comes into contact with said finger 47 when said operating limit is reached.

In the method of the invention, and independently of the nature of the carrier of the mechanism 1 and of the lever co-operating with said mechanism 1, the computer 20 determines an operating limit for said carrier.

On an aircraft equipped with a power plant having at least one engine, and at any time, the operating limit may be at least one of the following limits: a limit for the engine of the power plant, a limit for a load factor exerted on the aircraft, a limit for a vortex domain of an aircraft equipped with the mechanism, a limit for the maximum air speed ("Velocity, Never Exceed" or "VNE") of an aircraft equipped with the mechanism, a limit for the frequency of rotation (Nr) of the main rotor, a limit for the mast moment of the rotor of an aircraft equipped with the mechanism, and, for example, of a main rotor on a helicopter.

In order to determine its operating limit, the computer 20 may be connected to various measurement systems. For example, the computer is connected to a temperature sensor for sensing the temperature of each engine, to a torque sensor for sensing the torque of each engine, and to a rotation speed sensor for sensing the speed of rotation of each engine for assessing the limit for a parameter limiting the power plant using conventional methods. During the same flight, each engine can, in particular, operate at a plurality of ratings, and at at least one of the above-mentioned ratings: the takeoff rating PMD, the maximum continuous rating PMC, the transient rating PMT, the first emergency rating OEI30", the second emergency rating OEI2', and the third emergency rating OEICont. Each monitoring parameter can then be associated with one limit per rating. Thus, the operating limit can indicate exceeding of a limit of a monitoring parameter associated with an operating rating of the engine, for example, in particular of the monitoring parameter that is closest to its limit.

The computer may be connected to accelerometers of the aircraft or equivalent means for assessing the load factors undergone. Thus, an operating limit may, for example, indicate exceeding of a threshold of a load factor, and optionally of a threshold lower than a maximum load factor that is not to be exceeded.

The computer may be connected to air speed sensors for sensing the air speed of the aircraft or equivalent means for assessing its proximity to the speed not to be exceeded (Velocity, Never Exceed or VNE). Thus, an operating limit may, for example, indicate reaching of that maximum speed beyond which the aircraft might be damaged.

The computer may be connected to mast moment sensors for sensing the mast moment of the aircraft or equivalent means for assessing the forces undergone. Thus, an operating limit may, for example, indicate exceeding of a maximum mast moment threshold beyond which the mast or indeed the rotor head would be damaged.

The computer may be connected to at least one rotation speed sensor for sensing the speed of rotation (Nr) of a main rotor of the aircraft. Thus, an operating limit may, for example, indicate exceeding of a minimum threshold for the speed of rotation (Nr) of the main rotor below which the aircraft will leave its stable and safe flight domain.

For example, in the event of engine failure, the speed of rotation of the main rotor can drop. The operating limit may serve the function of indicating that the collective pitch of the blades of the main rotor must be decreased.

Figure 5:
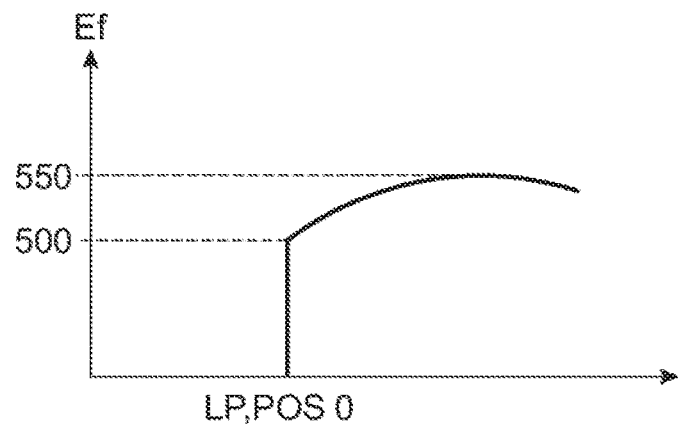
FIG. 5 is a graph for illustrating the method of generating an operating limit on which the position of the finger of the mechanism of the invention depends.

FIG. 5 shows how the mechanism operates with reference to the current operating limit. Thus, FIG. 5 shows a graph illustrating the force Ef generated by the mechanism 1 with reference to a position of the lever. FIG. 5 shows the rest position POS0 of the finger associated with the operating limit LP applicable.

So long as the operating limit is not reached, the mechanism does not exert any force on the lever. Conversely, as from the operating limit, the mechanism exerts a force that increases to a maximum force 550 and then decreases slightly due to the circular movement of the finger. The invention makes it possible to have a small difference between the pre-stressing 500 and the maximum force 550 deployed by the torsion spring, in particular due to the diameter of the torsion spring and to the position of the point of contact of the lever on the torsion spring that varies during the compression of the torsion spring.

From one instant to another, the operating limit may have a value that varies and/or the physical parameter associated with the operating limit may change. The operating limit may be a limit that varies when a lever is moved, that lever being configured to move the stop of the mechanism after said operating limit is exceeded. For example, the lever may be a lever of a conventional collective pitch control of a rotorcraft.

Figure 6:
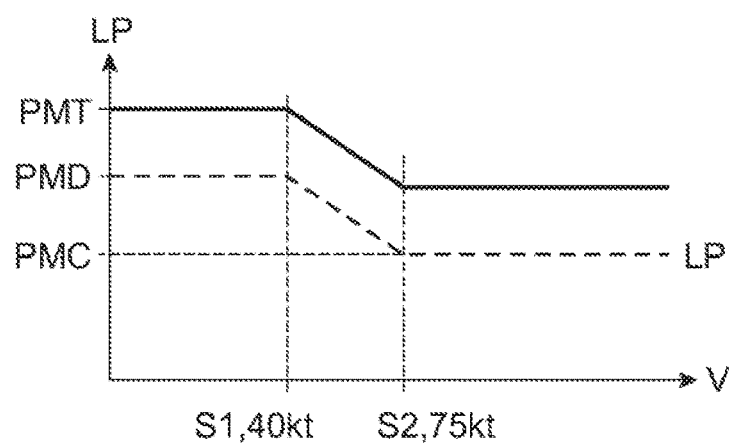
FIG. 6 is a graph for illustrating the method of generating an operating limit on which the position of the finger of the mechanism of the invention depends.

FIG. 6 shows the change in the operating limit on which the positioning of the finger in the rest position depends on a two-engined aircraft operating normally and in the presence of a lever of the type for controlling the collective pitch of a rotor.

When the aircraft is travelling at a forward speed or velocity V of less than a first velocity threshold S1, e.g., a threshold of 40 knots (kts), the operating limit LP corresponds to the limit of the limiting monitoring parameter at the takeoff rating PMD, the limiting monitoring parameter being the monitoring parameter of the aircraft that is closest to its limit. If the limit is exceeded, the power plant operates by applying the transient rating PMT and the mechanism 1 then exerts a force on the lever.

When the aircraft is travelling at a forward velocity V that is greater than a second velocity threshold S2, e.g., a threshold of 75 kts, the operating limit LP corresponds to the limit of the limiting monitoring parameter at the maximum continuous rating PMC. If the limit is exceeded, the power plant operates by applying the transient rating PMT and the mechanism 1 then exerts a force on the lever.

Between the first threshold and the second threshold, the limit can decrease linearly as a function of the forward velocity.

Figure 7:
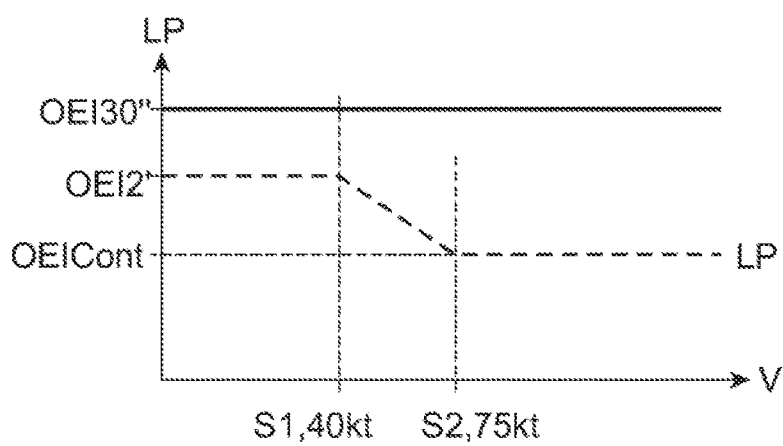
FIG. 7 is a graph for illustrating the method of generating an operating limit on which the position of the finger of the mechanism of the invention depends.

If the engine of the power plant fails, and with reference to FIG. 7, when the aircraft is travelling at a forward velocity V of less than a first velocity threshold S1, e.g., a threshold of 40 kts, the operating limit LP corresponds to the limit of the monitoring parameter limiting the second emergency rating OEI2'. If this limit is exceeded, the power plant operates by applying the first emergency rating OEI30" and the mechanism 1 then exerts a force on the lever.

When the aircraft is travelling at a forward velocity V that is greater than a second velocity threshold S2, e.g., a threshold of 75 kts, the operating limit corresponds to the limit of the monitoring parameter limiting the third emergency rating OEICont. If this limit is exceeded, the power plant operates by applying the first emergency rating and the mechanism 1 then exerts a force.

Between the first threshold and the second threshold, the limit can decrease linearly as a function of the forward velocity.

Regardless of the operating limit, when the operating limit is established, the computer 20 transmits a control signal to the actuator 10, which control signal carries information relating to the rest position that the finger 47 should reach in the absence of any force exerted by the lever on the finger 47.

In a first variant, the control signal may carry the rest position per se of the actuator.

In a first alternative of the first variant, the computer determines the rest position to be reached as a function of the operating limit, and then determines the movement that the actuator must make in order for the rest position to be reached by comparing the rest position and the current position of the actuator. Said current position may be measured by means of a sensor that measures the position of a movable member of the actuator and that is connected to the computer. Alternatively, the current position may be known directly by using a stepper motor. The control signal then directly causes the motor of the actuator 10 to move.

In a second alternative of the first variant, the computer 20 may transmit the control signal to a processor unit of the actuator 10 that controls the motor or the actuator proper of the actuator to cause it to reach the required position, optionally by making use of a current position of the actuator as measured by a sensor that measures the position of a movable member of the actuator.

In a second variant, the control signal may carry the operating limit, a processor unit of the actuator determining the rest position to be reached and controlling the motor or the actuator proper of the actuator accordingly.

Regardless of the variant, the actuator is set in motion so as to position the finger 47 in the required rest position, e.g., by causing the stopping piece 35 to turn about the axis of rotation AX.

When the lever presses against the finger and when each lug is in contact with the stopping piece, then the operating limit of the carrier has been reached. As from that instant, the operating limit can be exceeded, the lever then inducing movement of the finger relative to the enclosure of the spring box by compressing the torsion spring. A pilot moving the lever then feels the resistance of the torsion spring through the force generated by the finger on the lever and to be overcome in order to override the operating limit. The finger 47 generates torque on the lever 76 that increases as the finger moves away from the rest position. If the lever is released by a pilot, the torsion spring relaxes. The finger then moves the lever automatically by returning towards its rest position.

Naturally, the present invention can be the subject of numerous variants as to its implementation. Although several embodiments and implementations are described, it should readily be understood that it is not conceivable to identify exhaustively all possible embodiments and implementations. It is naturally possible to envisage replacing any of the means described by equivalent means without going beyond the ambit of the present invention.

What is claimed is:

1. A haptic alert mechanism configured to exert a force on a lever in order to indicate tactilely that an operating limit has been exceeded, the mechanism comprising an actuator; wherein the mechanism further comprises:
   at least one arm of a movable stopping piece, the arm being caused to move in rotation about an axis of rotation by the actuator; and a spring box provided with an enclosure inside which a pre-stressed torsion spring is arranged, the spring box being mounted to be movable in rotation about the axis of rotation, the enclosure including at least one lug that is mounted to be movable in rotation about the axis of rotation, the enclosure having a front flank, the torsion spring extending from a first end that is secured to the enclosure to a finger, the finger passing through an elongate orifice in the front flank and extending in part outside the enclosure by forming a movable, resilient stop that is overridable and adjustable, the mechanism having a rest position for the finger about the axis of rotation in the absence of any force exerted on the finger by the lever, which rest position is adjustable by moving the stopping piece, the rest position representing the operating limit when the lug is in contact with the at least one arm, the finger being movable in the orifice by compressing the torsion spring when the lever exerts a force on the finger with a view to overriding the operating limit.

2. The mechanism according to claim 1, wherein the orifice is an oblong hole centered on the axis of rotation.

3. The mechanism according to claim 1, wherein the finger is mounted to be movable in the orifice over a path from and including a first edge of the orifice to but not including a second edge of the orifice, the finger being pressed against the first edge in the absence of any force exerted on the finger by the lever, a clearance always separating the finger from the second edge of the orifice.

4. The mechanism according to claim 1, wherein the pre-stressing of the torsion spring is not adjustable.

5. The mechanism according to claim 1, wherein the actuator is provided with a rotary portion and with a non-rotary portion, the actuator having a brake configured to hold the rotary portion stationary relative to the non-rotary portion.

6. The mechanism according to claim 1, wherein the actuator is provided with a rotary portion that is mounted to be movable in rotation about the axis of rotation and that is connected to the at least one arm.

7. The mechanism according to claim 1, wherein the at least one arm comprises at least two arms carried by a hub fastened to the actuator, the at least one lug comprising one lug per arm.

8. The mechanism according to claim 1, wherein the at least one arm includes a yoke provided with two cheeks, the at least one lug being arranged between the two cheeks.

9. The mechanism according to claim 1, wherein the mechanism further includes a body that is mounted to be constrained not to move in rotation about an axis of rotation, the body carrying at least one stop member that is constrained not to move in rotation about the axis of rotation and that limits the amplitude of rotation of the at least one lug by shape interference.

10. The mechanism according to claim 9, wherein the body is disposed at least partially around the actuator, the stop member extending radially relative to the axis of rotation and away from the actuator, the spring box being mounted to pivot about the body.

11. The mechanism according to claim 1, wherein the enclosure comprises:

a first component comprising a rear flank carrying first branches, each first branch extending from the rear flank in an axial direction, the first end being fastened to the first component;

a second component provided with a ring carrying one second branch per first branch, the torsion spring extending in part inside a space arranged radially between the first branches and longitudinally between the rear flank and the ring, each second branch extending from the ring parallel to a first branch and away from the space, each second branch forming a lug of the at least one lug at least in part, the finger passing through the ring and projecting longitudinally relative to planes containing free ends of the first branches and of the second branches; and a bearing passing through the rear flank and the torsion spring and the ring, the bearing carrying the front flank, the front flank having one notch per lug, and each lug being arranged in one of the notches.

12. The mechanism according to claim 11, wherein the mechanism further includes a body that is mounted to be constrained not to move in rotation about an axis of rotation, the body carrying at least one stop member that is constrained not to move in rotation about the axis of rotation and that limits the amplitude of rotation of a lug by shape interference and wherein the stop member is arranged longitudinally between the front flank and the at least one arm.

13. The mechanism according to claim 1, wherein the mechanism further comprises a contactor that detects contact between the finger and the lever.

14. The mechanism according to claim 1, wherein the operating limit may be at least one of the following limits:

a limit for a power plant of an aircraft equipped with the mechanism, a limit for a load factor exerted on an aircraft equipped with the mechanism, a limit for a vortex domain of an aircraft equipped with the mechanism, a limit for a maximum air speed of an aircraft equipped with the mechanism, a limit for a speed of rotation of a main rotor, and a limit for a mast moment for a rotor of an aircraft equipped with the mechanism.

15. An aircraft equipped with a rotor and with a lever of a collective pitch control that is connected to a control linkage for collectively controlling a pitch of blades of the rotor;

wherein the aircraft includes the mechanism according to claim 1, the aircraft including a computer connected to the actuator, the computer being configured to establish the operating limit and transmitting a control signal to the actuator so that the lever comes into contact with the finger when the operating limit is reached.

16. A method of assisting with controlling the aircraft according to claim 15, wherein the method comprises the following steps:

determining with the computer of an operating limit for the aircraft;

transmitting with the computer to the actuator a control signal carrying information relating to the rest position that the finger should reach in the absence of any force exerted by the lever on the finger;

moving the actuator so as to position the finger in the rest position; and overriding the operating limit by exerting a force on the finger with the lever, the finger generating torque on the lever that increases as the finger moves away from the rest position.

* * * * *